F. BEEMER.
ANNULAR BALL BEARING.
APPLICATION FILED MAY 27, 1918.
1,286,505.
Patented Dec. 3, 1918.
2 SHEETS—SHEET 1.
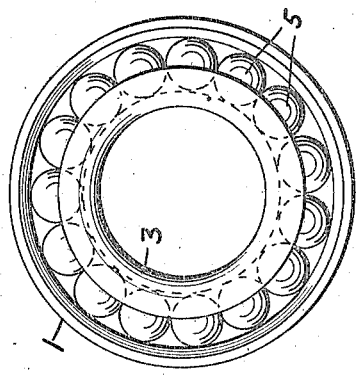
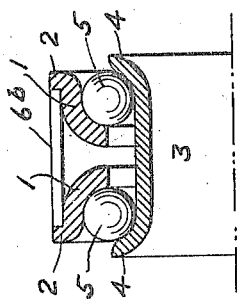
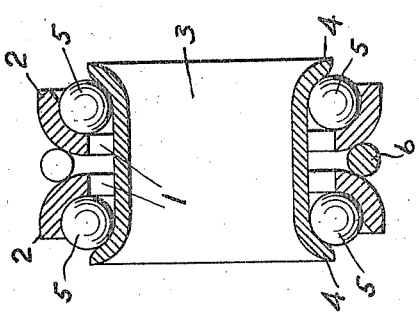
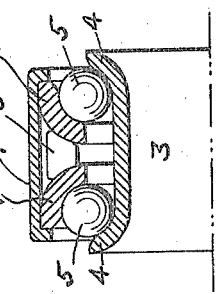
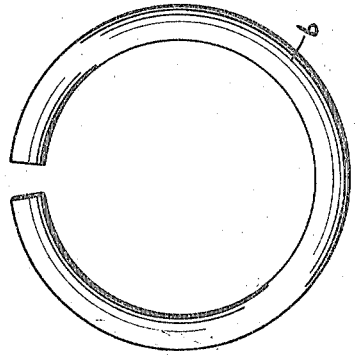
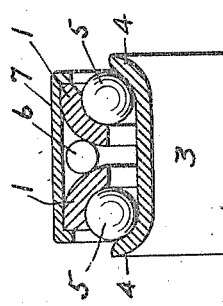
WITNESS:
INVENTOR
Frank Beemer
BY
Augustus B. Stoughton
ATTORNEY.

F. BEEMER.
ANNULAR BALL BEARING.
APPLICATION FILED MAY 27, 1918.

1,286,505.

Patented Dec. 3, 1918
2 SHEETS—SHEET 2.

WITNESS:

INVENTOR
Frank Beemer
BY
Augustus B. Stoughton.
ATTORNEY.

UNITED STATES PATENT OFFICE.

FRANK BEEMER, OF PHILADELPHIA, PENNSYLVANIA.

ANNULAR BALL-BEARING.

1,286,505.  Specification of Letters Patent.  Patented Dec. 3, 1918.

Application filed May 27, 1918. Serial No. 236,740.

*To all whom it may concern:*

Be it known that I, FRANK BEEMER, a citizen of the United States, and a resident of Philadelphia, in the county of Philadelphia and State of Pennsylvania, have invented certain new and useful Improvements in Annular Ball-Bearings, of which the following is a specification.

The principal objects of the present invention are, first, to provide an improved, simplified and convenient construction and combination of sheet metal parts which can be readily assembled into the form of an inexpensive, durable and reliable annular bearing having two circular rows of balls and adapted to take a radial load together with end thrust in two directions; second, to provide for taking up slack or play between the parts in order to avoid noise and looseness; third, to provide simple means for maintaining the parts in assembled relation, and fourth, to provide an efficient, acceptable and comparatively inexpensive annular bearing of the stamped or pressed sheet metal variety.

To these and other ends hereinafter set forth the invention comprises the improvements to be presently described and finally claimed.

In the accompanying drawings, forming part hereof,

Figure 1, is a side view of an annular ball bearing embodying features of the invention.

Fig. 2, is a transverse sectional view of the same.

Fig. 3, is a side view of one of the elements shown in Fig. 2.

Figs. 4, 5, and 6, are transverse sectional views of parts of an annular ball bearing embodying modifications of the invention.

Figure 7:
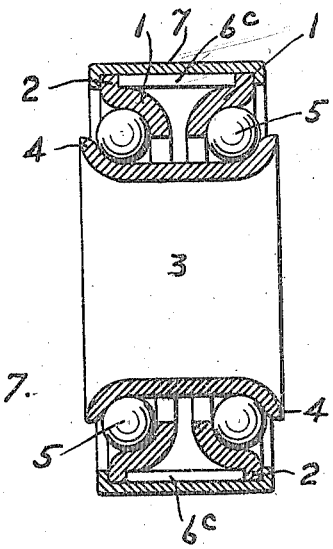
Figure 8:
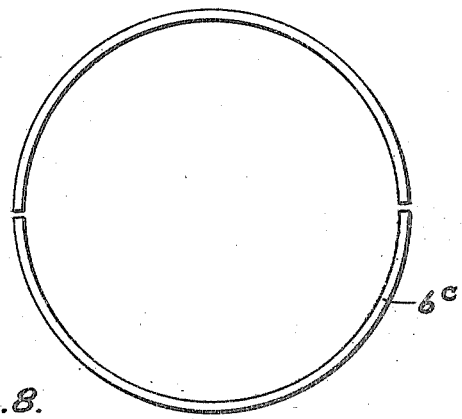

Fig. 7, is a transverse sectional view of a bearing embodying another modification of the invention, and Fig. 8, is a side view of elements shown in Fig. 7.

Referring to the drawings there are two centrally perforated dished-disks 1, arranged back to back with their flaring portions 2 extending in opposite directions. These disks 1 may be stamped, punched, pressed or otherwise fabricated from sheet metal. 3, is a ring arranged through the disks 1 and having outwardly flaring ends 4, respectively confronting the inner flaring surfaces of the disks. This ring can be made of sheet metal. There are two circular rows of balls 5 arranged respectively between the outer flaring surfaces of the ends of the ring 3 and the inner flaring surfaces of the disks. The central opening in the disks is large enough to permit the disks to be passed over the ends of the ring and when the disks are shifted or moved inward from the ends of the ring, sufficient space is provided for the insertion of the balls. There is a split ring interposed between the disks for the maintenance of the assemblage. In Figs. 1 to 4, this split ring 6, is a spring ring and it is circular in cross-section, whereas in Fig. 5, this split spring ring 6ª, is of generally wedge-like cross-section. However, in all these figures the split spring ring not only maintains the assemblage but takes up any slack or play between the parts, thus avoiding noise and looseness.

Referring to Figs. 4 and 5, 7 is a band with inturned edges that may be applied around the periphery of the disks. The edges of the band 7, or more accurately, one of them, can be crimped in after the application of the band. The split spring ring 6ᵇ, in Fig. 6, is oblong in cross-section and is seated between the outwardly extending flanges of the flaring ends of the disks and it serves to maintain the assemblage. The split ring need not be a spring ring and it may have more than one split. Such a two-part, non-spring ring 6ᶜ, is shown in Figs. 7 and 8, and its parts are confined by the band 7, in order to cause it to maintain the assemblage. It will, of course, be understood that the split spring ring can be put or sprung in place after the other parts of the bearing have been assembled, but of course prior to the application of the band 7.

It may be remarked that the split ring takes a part in resisting end-thrust within the limits of the capacity of the bearing.

What I claim is:

1. An annular ball bearing comprising, in combination, two sheet metal centrally perforated dished-disks arranged back to back with their flaring portions extending in opposite directions, a sheet metal ring arranged through the disks and having outwardly flaring ends respectively confronting the inner flaring surfaces of the disks, and adapted for passage through the openings in the disks, two circular rows of balls arranged respectively between the outer flaring surfaces of the ends of the ring and the inner flaring surfaces of the disks, and a split ring interposed between the disks to maintain the assemblage.

2. An annular ball bearing comprising in combination, two sheet metal centrally perforated dished-disks arranged back to back with their flaring portions extending in opposite directions and provided with flanges, a sheet metal ring arranged through the disks and having outwardly flaring ends respectively confronting the inner flaring surfaces of the disks, and adapted for passage through the opening in the disks, two circular rows of balls arranged respectively between the outer flaring surfaces of the ends of the ring and the inner flaring surfaces of the disks, and a ring interposed between the flanges, substantially as described.

3. An annular ball bearing comprising, in combination, two sheet metal centrally perforated dished-disks arranged back to back with their flaring portions extending in opposite directions, a sheet metal ring arranged through the disks and having outwardly flaring ends respectively confronting the inner flaring surfaces of the disks, and adapted for passage through the opening in the disks, two circular rows of balls arranged respectively between the outer flaring surfaces of the ends of the ring and the inner flaring surfaces of the disks, a split ring interposed between the disks to maintain the assemblage, and a band covering the ring and providing a cylindrical exterior surface.

FRANK BEEMER.